(12) United States Patent
Emery et al.

(10) Patent No.: US 7,509,190 B2
(45) Date of Patent: Mar. 24, 2009

(54) METHOD FOR ADMINISTERING AN INTERMITTENT UNCONTROLLABLE ELECTRIC POWER GENERATING FACILITY

(75) Inventors: Keith E. Emery, North Richland Hills, TX (US); Christopher M. Grammer, Dallas, TX (US); Gregory B. Galloway, Grapevine, TX (US); John A. Pakulski, Mansfield, TX (US); David C. Matthews, Arlington, TX (US); Ruwan N. Rodrigo, Irving, TX (US)

(73) Assignee: Tenaska Power Services Co., Arlington, TX (US)

( * ) Notice: Subject to any disclaimer, the term of this patent is extended or adjusted under 35 U.S.C. 154(b) by 188 days.

(21) Appl. No.: 11/732,260

(22) Filed: Apr. 3, 2007

(65) Prior Publication Data

US 2008/0249665 A1    Oct. 9, 2008

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 21/00 | (2006.01) |
| G01R 21/06 | (2006.01) |
| G01R 11/56 | (2006.01) |
| G01R 21/133 | (2006.01) |
| G06F 11/00 | (2006.01) |
| G08B 23/00 | (2006.01) |
| H02P 9/04 | (2006.01) |
| F03D 9/00 | (2006.01) |

(52) U.S. Cl. ............... 700/291; 702/62; 702/188; 705/412; 290/44; 290/55; 340/870.02

(58) Field of Classification Search ............... 700/286, 700/291; 702/60–62; 705/412; 290/44, 290/55; 340/870.01, 870.02
See application file for complete search history.

(56) References Cited

U.S. PATENT DOCUMENTS

| 6,108,590 | A  | * | 8/2000 | Hergert ............... 700/284 |
| 6,512,966 | B2 | * | 1/2003 | Lof et al. ............. 700/291 |
| 6,529,839 | B1 | * | 3/2003 | Uggerud et al. ....... 702/61 |
| 7,346,462 | B2 | * | 3/2008 | Delmerico ............ 702/60 |
| 2002/0013689 | A1 | * | 1/2002 | Hunton ............... 703/18 |
| 2002/0019758 | A1 | * | 2/2002 | Scarpelli ............. 705/7 |
| 2002/0091626 | A1 | * | 7/2002 | Johnson et al. ....... 705/37 |
| 2005/0039787 | A1 | * | 2/2005 | Bing ................ 136/243 |
| 2005/0165511 | A1 | * | 7/2005 | Fairlie ............... 700/286 |
| 2005/0283346 | A1 | * | 12/2005 | Elkins et al. .......... 703/4 |
| 2008/0046387 | A1 | * | 2/2008 | Gopal et al. .......... 705/412 |
| 2008/0177678 | A1 | * | 7/2008 | Di Martini et al. ...... 705/412 |
| 2008/0195255 | A1 | * | 8/2008 | Lutze et al. .......... 700/291 |

* cited by examiner

*Primary Examiner*—Crystal J Barnes Bullock
(74) *Attorney, Agent, or Firm*—F. Lindsey Scott

(57) ABSTRACT

A method for administering an intermittent source of electrical power generation, such as a wind powered electric power generating facility, to produce electric power at a level up to a pre-set level during a selected time period.

10 Claims, 1 Drawing Sheet

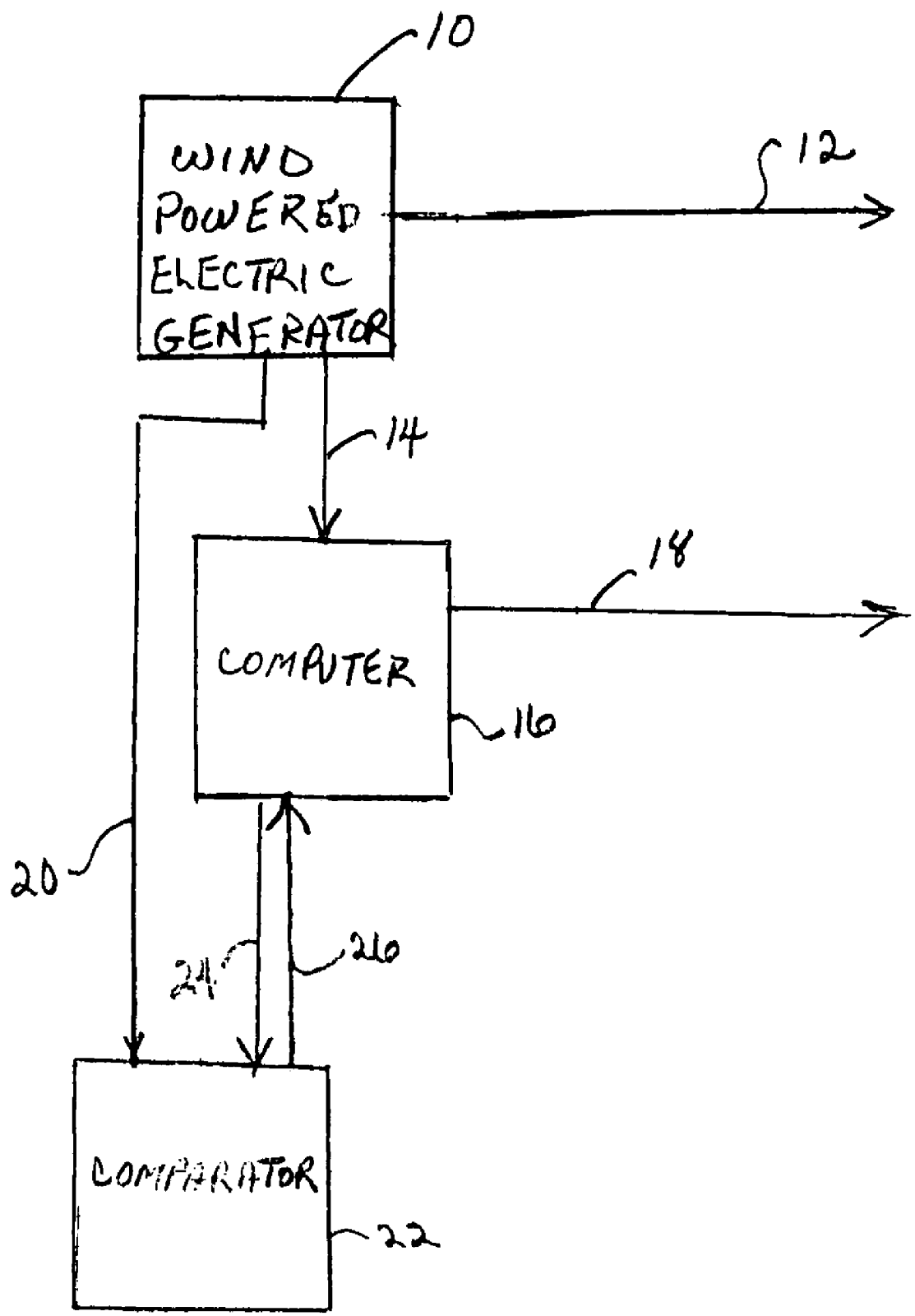

METHOD FOR ADMINISTERING AN INTERMITTENT UNCONTROLLABLE ELECTRIC POWER GENERATING FACILITY

FIELD OF THE INVENTION

The present invention relates to a method for administering an intermittent, uncontrollable electric power generating facility with electrical output which may be unpredictable or statistically random, such as a wind-powered generator. The invention would enable a party to estimate, schedule, and otherwise provide automated updates of estimated production, in a dependable manner, to an electric grid controller.

BACKGROUND OF THE INVENTION

Intermittent and uncontrollable electric power generators ("Intermittent Generators") are commonly used to generate electric power. For example, power may be produced utilizing wind turbine generators with electrical output which is a function primarily of wind velocity and duration, but may be affected by a number of other variables. A significant characteristic from the standpoint of scheduling and dispatching energy from this type of resource is that the resource's ability to generate electricity is variable and intermittent depending upon weather circumstances beyond the administrator's control. There are other types of intermittent or "as-available" power generators, including but not limited to solar power, wave power, and geothermal power, all of which depend upon forces of nature beyond the administrator's control. Another example of an intermittent or "as-available" generator is a cogenerator or qualifying facility which has its net electrical output affected by changes in steam demand, host electrical load changes, and other "behind the fence" influences and actions which are beyond the administrator's control or prediction. Since substantial power is produced by such facilities, it is desirable that they be integrated into the power grid so that the power they produce can displace power generated by less economic resources or less environmentally friendly resources. Electricity produced by more conventionally powered and controllable generators is generally more readily predictable and controllable than the power delivered by an Intermittent Generator. It is highly desirable that an accurate estimate, or schedule, of the power to be generated by the Intermittent Generator be determined and continuously updated with the grid controller to support the reliable operation of the electric power grid, and to minimize economic and compliance penalties which may arise from large deviations between the actual electric output of an Intermittent Generator and its scheduled, or estimated, output maintained with the grid controller. This permits the grid controller to more reliably and economically match generation to load, and be able to take into account likely available intermittent sources of electric generation, resulting in increasing the ability to displace energy produced by less economic or less environmentally friendly generation sources with energy produced by more environmentally friendly or economical intermittent resources.

In spite of significant resources and efforts being expended to enhance the accuracy of forecasting the electrical output of wind powered electrical generators, and other Intermittent Generators, it continues to be extremely difficult to provide accurate and up-to-date estimates of the production of electricity from these facilities.

Actual electrical generation which is less than the quantity of energy scheduled (estimated) with the grid controller causes the need for certain adjustments in the amounts of electricity supplied to the grid. Of even greater consequence, at least to the Intermittent Generator, is the delivery of more electricity than scheduled (estimated) with the grid controller. When this occurs, the grid controller routinely assesses economic and compliance penalties against the intermittent generation facilities for the delivery of greater amounts of electricity than previously scheduled (estimated) to the grid controller.

Accordingly, it is highly desirable that a method be available for the administration of wind powered and other Intermittent Generators, so that the administrator of such generation can be able to schedule, or estimate, their production of electricity in such a manner as to minimize the difference between the electric power schedules submitted to the grid controller, and actual electric power generation produced in real time.

Typically the administrator of a generation plant provides a schedule, or estimate, of projected electric generation to the grid controller at various times, typically from one hour to one or more days in advance of the period of actual power production. The estimate may be adjusted to account for expected changes in the forecasted power production, according to a defined notice period. For example, a grid controller may require receipt of a revised schedule of power production as much as two hours prior to the time interval affected by the revised schedule. Such revisions to the schedule of power production may also apply to the remaining time period for which the grid controller allows or requires changes.

Accordingly, methods have been sought to schedule, or estimate, the amount of power which will be produced by wind powered or other Intermittent Generators as accurately as possible in order to minimize the differences between the scheduled energy output and the actual amount of power produced, on an updated basis, and to timely provide updated estimates to the grid controller.

SUMMARY OF THE INVENTION

The present invention comprises a method for administering a wind powered or other Intermittent Generator which is interconnected with a regional electric power transmission and distribution grid, to provide up-to-date estimates, or schedules, of the projected electric power to be produced by the facility during a selected future time period by comparison to at least one past time period, or utilizing other defined user input formulae, the method comprising: obtaining past electric power production data for the facility for a past time period and for incremental past time portions of the past time period; obtaining an estimate of the electric power production for the facility for the selected future time period to provide an electric power production estimate for the facility; reporting the electric power production estimate for the selected period to a grid controller; obtaining current electric power production data for the facility for incremental time portions of the selected time period; comparing the current electric power production data from the facility to the past time electric power production data; adjusting the electric power production estimate for the facility for a remainder of the selected period; and providing an adjusted electric power production estimate, or schedule, to the grid controller.

BRIEF DESCRIPTION OF THE DRAWING

The FIGURE is a schematic diagram of the flow of information as required in an embodiment of the present invention.

DESCRIPTION OF PREFERRED EMBODIMENTS

Wind powered and other Intermittent Generators are required to be integrated into a power grid. This is typically accomplished by a grid controller, also known as a Regional Transmission Organization (RTO), Independent System Operator (ISO), control area operator, or other similar designation, which agency has been designated by a governmental authority and the North American Electric Reliability Corporation, Inc. as responsible for administrating a defined electric grid. Intermittent Generators typically utilize a scheduling entity to communicate and adjust their estimated power production to a grid controller via an energy schedule ("Schedule"). As noted previously, the amount of power produced by Intermittent Generators is relatively inflexible, or uncontrollable, and may vary significantly and unintentionally due to dependence on unpredictable weather, wind, processes, and other external variables.

Various forecasting techniques have been used to try to accurately estimate the power to be produced by Intermittent Generators. Such systems include historical databases, use of weather, wind, and process forecasts and the like.

The present inventors have found a more reliable method of forecasting the future generation level of an Intermittent Generator by simply using the recent history of the actual electrical output of an Intermittent Generator.

Accordingly, the present invention relies upon obtaining the past electric power production data for the facility for a configurable past time period, typically one day, although longer or shorter periods of time can also be used, and for incremental past time portions of the past time period. These are typically minutes or hours. Therefore, the most commonly used system for reporting the power generation from a particular facility is a report of the total power produced by the facility and the amount of power produced in each incremental period. Therefore, twenty-four hours of power production is reported with the production per hour reported with the report of the production for the entire period.

For future periods, a cut-off date is supplied by which the grid controller must be notified by the scheduling entity for the Intermittent Generator, of the quantities of power to be delivered by the individual or group of Intermittent Generator(s). This Schedule provides the basis for the grid controller to adequately plan the power production and dispatch of various facilities producing power for the grid, to maintain the reliable operation of the interconnected electric grid by ensuring a close balance between total electric generation and electrical demand.

While both under-generation and over-generation of power versus scheduled output of Intermittent Generators is problematic, over-generation typically creates more significant financial penalties to an Intermittent Generator. Accordingly, the system used by the present invention is directed toward ensuring that the amount by which actual power production from the Intermittent Generator exceeds the Schedule is minimized.

Reference to a "Facility" means one or more, typically more than one, Intermittent Generators, such as an array of windmills, a solar farm, a private network of interdependent generation and load facilities, or the like. These may be reported together as an overall producing unit to the grid controller.

The actual power production of the Intermittent Generator is carefully monitored and archived electronically. This monitoring includes measuring the actual power production from the Intermittent Generators, which is then compared to the output from a previous time period from the same facility, with possible adjustment of the existing Schedule submitted to the grid controller, based upon recurring variations as a result of the time of day, configurable formulae, and the like which are incorporated into the historical data. The amount of power produced is then projected to the entire time period's production and the Schedule provided to the grid controller is adjusted, if and as necessary, to the amount of power which is estimated to be produced by the facility during the remainder of the time period. Over-generation can most typically result in financial penalties imposed by the grid controller for actual power production which exceeds the scheduled level of power production.

Having determined the variance between the most recent forecast level of power production from the Intermittent Generator, the Schedule for power production for the next time period in the future can be adjusted by notice to the grid controller effective after some period of time (the exact lead time required to implement Schedule changes varies depending on specific grid controller operating procedures) for permissible adjustments in the scheduled amount of power to be produced in total during the period.

Typically the historical data, (i.e., the data for the power production from the previous day) may be supplied by the operator of the Intermittent Generator. The operator may include factors in the determination of the historical data to be provided, such as wind velocity, humidity, stability, production formulae, and the like in the previous time period and may adjust the past performance data for perceived variations in the weather conditions and the like. These variations are included in the present invention through the use of input formulae configurable by the individual Intermittent Facility. A database of past performance of the Intermittent Generator may be factored in to the comparisons made as described hereinafter for the performance of the facility.

Typically, the data received from the operator, or which may be measured by the administrator, is translated into a form suitable for use by the grid controller and forwarded to the grid controller electronically and automatically, where the required translations into a proper format have been achieved. Typically, for each scheduling time period, the operator of the facility will provide the administrator with all relevant operating parameters applicable to each time interval of the next scheduling time period, along with an energy output forecast which includes both projected power output of individual Intermittent Generators and an aggregate obligation Schedule. The obligation Schedule will be an energy (including load or energy transactions) Schedule which is typically provided to the grid controller. The estimate for the following time period is typically reviewed to ensure that the amount of actual power production is not greater than the Schedule provided to the grid controller. Various types of information are required for this determination, as well as for determinations to ensure that the low and high operating limits for the facility are within the desired ranges. The individual time segment monitoring is done throughout the time period to produce the data for the preceding time period. Monitoring the facility on an individual time segment basis is initiated to determine the output per each time segment, which is then compared to the output for the comparable period in the previous time period to determine whether production is proceeding at the scheduled output level. If the Schedule should be increased or decreased based upon the comparison, an adjustment to the power Schedule is supplied to the grid controller, and may be included in the Schedule after a selected period defined by the grid controller, to adjust the Schedule for the current time period based upon the production of electric power from the facility to date. Longer periods can be used and multiple adjustments can be used.

The objective is to adjust the Schedule to be as accurate with the actual output of the Intermittent Generators as possible. In other words, the actual power production from the Intermittent Generator is impossible to control, but the Schedule provided to the grid controller can be adjusted with suitable notice periods to bring the actual and scheduled power production into close agreement, thereby minimizing exposure to economic and compliance penalties.

Typically this may be performed as shown schematically in the attached FIGURE. An Intermittent Generator 10, which may be a wind generation facility or the like, is shown and produces power as shown by line 12. A record is kept of the power production during a selected past time period and incremental segments, typically one hour, of the selected past time period. It will be understood that different past time periods and different segments of selected past time periods could be used, and that the invention is designed to configure the time periods used (historical actual power production and affected future scheduling periods), to reflect the individual characteristics of specific Intermittent Generators and grid controller rules and requirements. This historical data is provided by the Intermittent Generator operator through line 14, to a computer 16 or determined by the administrator from information schematically shown passing to a computer 16 through line 14. The computer receives this information, translates it into a suitable format and passes it through a line 18 to the grid controller, without manual intervention. After the information has been forwarded to the grid controller, immediately information is collected from the Intermittent Generator or forwarded by the operator of the Intermittent Generator via a line 20 to a comparator 22 where the information from line 20 is compared to information from a comparable past time period as arbitrarily determined and supplied via a line 24 by computer 16. After the comparison, the results of the comparison are passed via a line 26 to computer 16 and may be used to adjust the power Schedule provided to the grid controller through line 18.

Wide variations are intended and possible in the implementation of the present invention. For instance, the operator of generator 10 may supply the information supplied via line 20 to the comparator 22 and while, according to the present invention, the best data for use is data from an immediate previous past period time, the data may be adjusted for various conditions or formulae which have been agreed upon as likely to provide the most accurate estimate. These numbers are provided through line 24 to comparator 22 where a comparison is made with the results being passed via line 26 to a computer 16. For instance, it may be determined by comparison that the facility is producing ten percent (10%) more power during the current time period than previously estimated. The estimate to the grid controller can be changed to reflect the total estimated power output now expected in contrast to the earlier estimate. While a delay of a short time period, for instance two hours or the like, may be required before adjustment of the estimate is actually implemented, the new estimate allows for the adjustment of the power supply Schedule to more accurately reflect the amount of power that will actually be produced.

Desirably, the computer is provided with suitable programming to enable determination of the estimates without the need for manual intervention. Available systems, such as a WINDOWS (trademark of Microsoft Corporation for software products) system, are suitable for programming to perform these functions.

The functions shown as computer 16 and comparator 22 may well be, and typically are, the same unit. They are shown separately in the FIGURE to separate the functions. The computer includes programs to convert the raw data received through line 14 into a format suitable for passage through line 18 as an estimate to the grid controller. The computer may also contain programs to facilitate the development of estimates based upon the comparator results. The comparator may also include programs which may include information beyond that normally supplied with the data from the Intermittent Facility and the computer.

The data considered to be most significant are the past time data and the current energy production by the Intermittent Generator.

While the present invention has been described by reference to certain of its preferred embodiments, the embodiments described are illustrative rather than limiting in nature, and many variations and modifications are possible within the scope of the present invention. Many such variations and modifications may be considered obvious and desirable by users of this invention upon a review of the foregoing description of preferred embodiments.

What is claimed is:

1. A method for administering an intermittent source of electrical power generation including a wind powered electric power generation facility, for inclusion in a regional electric power transmission and distribution grid to provide up-to-date estimates, or schedules, of the electric power to be produced by the facility during a selected future time period by comparison to at least one past time period, the method comprising:
    a) obtaining past electric power production data for the facility for a past time period and for incremental past time portions of the past time period;
    b) obtaining an estimate (schedule) of the electric power production for the facility for the selected future time period to provide an electric power production schedule for the facility,
    c) reporting the electric power production estimate (schedule) for the selected period to a grid controller;
    d) obtaining current electric power production data for the facility for incremental time portions of the selected time period;
    e) comparing the current electric power production data from the facility to the past time electric power production data; and
    f) adjusting the electric power production estimate (schedule) for the facility for a remainder of the selected period and providing an adjusted electric power production schedule to the grid controller.

2. The method of claim 1 wherein the facility comprises a plurality of intermittently powered electric power generating units.

3. The method of claim 1 wherein the past time period is about one day and wherein the incremental past time portions are about one hour.

4. The method of claim 1 wherein the estimate of the electric power production for the selected future time period is based upon the past electric production data.

5. The method of claim 1 wherein the estimate of the electric power production for the selected past time period is supplied by the operator of the facility.

6. The method of claim 1 wherein the electric power production data comprises actual measured current electric power production from the facility for at least one incremental time period of the selected time period.

7. The method of claim 1 wherein the current electric power production of the facility during an incremental time portion of the selected time period is compared to an incremental past time portion of the past period to determine whether the accuracy of the estimate of electric power production during the selected period is accurate.

8. The method of claim 7 wherein the electric power production schedule to the grid controller is adjusted based upon the comparison.

9. The method of claim 7 wherein an adjusted electric power production schedule based upon the comparison is calculated and provided to the grid controller.

10. The method of claim 9 wherein the adjusted electric power production schedule provided to the grid controller is adjusted to a value at least equal to the electrical power production estimated from the comparison.

\* \* \* \* \*